United States Patent
Kim (10) Patent No.: US 8,149,464 B2
(45) Date of Patent: Apr. 3, 2012

(54) CLUSTERED DOT-SCREEN DESIGN METHOD, A DEVICE TO PERFORM THE CLUSTERED DOT-SCREEN DESIGN METHOD BASED ON HUMAN VISION AND PRINTER MODEL CHARACTERISTICS, AND AN IMAGE-FORMING APPARATUS TO OUTPUT BINARY IMAGES ON A DESIGNED SCREEN

(75) Inventor: Sang-ho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1590 days.

(21) Appl. No.: 11/221,778

(22) Filed: Sep. 9, 2005

(65) Prior Publication Data

US 2006/0066908 A1   Mar. 30, 2006

(30) Foreign Application Priority Data

Sep. 10, 2004 (KR) .................. 10-2004-0072484

(51) Int. Cl.
*H04N 1/405* (2006.01)
*H04N 1/40* (2006.01)

(52) U.S. Cl. ............. 358/3.09; 358/3.06; 358/3.07; 358/3.08; 358/3.16; 358/3.17; 358/3.18; 358/3.19; 358/3.21

(58) Field of Classification Search ........... 358/3.06, 358/3.09, 1.14, 1.15, 1.9; 382/236, 237, 382/262
See application file for complete search history.

(56) References Cited

U.S. PATENT DOCUMENTS

| | | | |
|---|---|---|---|
| 4,149,194 A | 4/1979 | Holladay | |
| 5,191,640 A * | 3/1993 | Plass | 358/1.13 |
| 5,235,435 A * | 8/1993 | Schiller | 358/3.07 |
| 5,583,660 A | 12/1996 | Rylander | |
| 5,625,756 A * | 4/1997 | Campbell | 358/1.9 |
| 5,673,121 A * | 9/1997 | Wang | 358/3.23 |
| 5,812,140 A * | 9/1998 | Borg et al. | 345/428 |
| 5,855,433 A | 1/1999 | Velho et al. | |
| 5,859,955 A * | 1/1999 | Wang | 358/1.9 |
| 6,172,770 B1 * | 1/2001 | Inoue | 358/3.06 |
| 6,252,679 B1 * | 6/2001 | Wang | 358/1.9 |
| 6,335,989 B1 | 1/2002 | Lin | |
| 6,563,957 B1 * | 5/2003 | Li et al. | 382/252 |
| 7,554,696 B2 * | 6/2009 | Chang | 358/3.01 |
| 2002/0186267 A1 * | 12/2002 | Velde et al. | 347/15 |
| 2004/0218222 A1 * | 11/2004 | Damera-Venkata | 358/3.13 |
| 2004/0252346 A1 * | 12/2004 | Huang et al. | 358/3.14 |

\* cited by examiner

*Primary Examiner* — Benny Tieu
*Assistant Examiner* — Haris Sabah
(74) *Attorney, Agent, or Firm* — Stanzione & Kim, LLP (57) ABSTRACT

A clustered-dot screen design method, a device to perform the clustered-dot screen design method based on human vision characteristics and printer model characteristics, and an image-forming apparatus to output binary images using designed screens. The clustered-dot screen design method based on the human vision characteristics and the printer model characteristics includes determining positions of a plurality of clustered-dot centers using a predetermined method, and designing a screen by growing specific sub-dots about the cluster centers using a predetermined algorithm according to position information of the cluster centers, the human vision characteristics, and the printer model characteristics. The clustered-dot design method has a high tolerance for defects of printers, since a dot growth sequence about the cluster centers is designed in an optimized method based on the human vision characteristics and the printer model characteristics to have an optimized image quality in output images of the printers, and the dots are clustered about the cluster centers.

35 Claims, 10 Drawing Sheets

Halftoned image generated by a conventional 141 LPI, 45° clustered-dot screen.

FIG. 2B
(PRIOR ART)

Halftoned image generated by a conventional 212 LPI, 45° clustered-dot screen.

141 LPI. 45°

FIG. 7B

212 LPI. 45°

CLUSTERED DOT-SCREEN DESIGN METHOD, A DEVICE TO PERFORM THE CLUSTERED DOT-SCREEN DESIGN METHOD BASED ON HUMAN VISION AND PRINTER MODEL CHARACTERISTICS, AND AN IMAGE-FORMING APPARATUS TO OUTPUT BINARY IMAGES ON A DESIGNED SCREEN

CROSS-REFERENCE TO RELATED APPLICATIONS

This application claims the benefit under 35 U.S.C. §119 of Korean Patent Application No. 2004-72484, filed on Sep. 10, 2004, the entire contents of which are incorporated herein by reference.

BACKGROUND OF THE INVENTION

1. Field of the Invention

The present general inventive concept relates to a screen design method, and more particularly to a clustered dot-screen design method, a device to perform the clustered dot-screen design method based on human vision and printer model characteristics, and an image-forming apparatus to output binary images on a designed screen.

2. Description of the Related Art

In general, binary output devices, such as digital printers, photocopiers, binary output LCDs, and the like, express a diverse array of colors using two colors including white and black. For example, a black and white digital printer expresses black and white images displayed on a monitor using two values that respectively correspond to black and white. In order to output the black and white images having different brightness levels that are displayed on the monitor to the black and white digital printer, the black and white digital printer or a personal computer performs a series of operations to convert input images into binary images. That is, an operation for converting a color image into a gray-scaled image by converting respective pixel colors into gray colors having brightness of 0 to 255 is required. An operation for converting the gray-scaled image into a binary image is also required. Images having brightness values between 0 (black) and 255 (white) are referred to as gradation images, and the operation for converting the gradation images into the binary images is referred to as halftoning.

The halftoning technique includes error diffusion methods, which are mainly used in inkjet printers and multi-function printers, and screening methods, which are mainly used in laser printers.

The error diffusion methods effectively reproduce continuous gradation images while maintaining boundaries, since the error diffusion methods minimize an average error in the binary images by distributing errors, which occur during conversion of the continuous gradation images into the binary images, to neighboring pixels.

The screening methods convert the continuous gradation images into tiny dots in order to reproduce a shading or a gradation of the continuous gradation images.

The screening methods can be classified as a clustered-dot screening method for forming binary halftone dots as closely as possible or as a dispersed-dot screening method for forming the binary halftone dots as far away as possible. The clustered-dot screening method has a poor performance when displaying detailed image components as compared to the dispersed-dot screening method. However, the clustered-dot screening method advantageously has good tone reproduction and a high tolerance for drawbacks that typically occur in the laser printers. On the other hand, the dispersed-dot screening method is more suitable for display devices or the inkjet printers, since the dispersed-dot screening method has an advantage of being able to express the detailed image components effectively even though the dispersed-dot screening method is easily affected by the drawbacks that typically occur in the laser printers.

Other types of screening methods also exist. For example, an ordered-dot screening method regularly forms binary halftone dots depending on certain lines per inch (LPI) and angles, and a stochastic-dot screening method irregularly forms binary halftone dots. The stochastic-dot screening method has an advantage over the ordered-dot screening method with respect to image quality, since less visual patterns can be perceived when compared to the ordered-dot screening method. However, halftoned images produced by the ordered-dot screening method have a better compression rate.

Recently, interest in model-based halftoning has increased.

Figure 1:
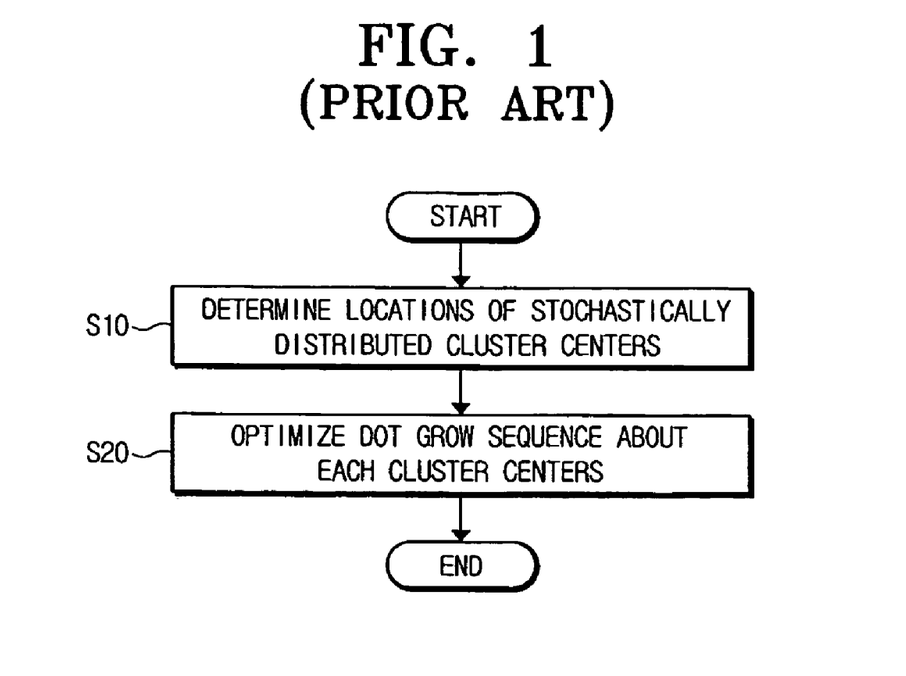
FIG. 1 is a flow chart illustrating a conventional halftoning method for designing a stochastic clustered-dot screen.

FIG. 1 is a flow chart illustrating a conventional halftoning method for designing a stochastic clustered-dot screen. The method of FIG. 1 is disclosed in U.S. Pat. No. 5,859,955.

The halftoning method illustrated in FIG. 1, which uses the stochastic-dot screening method and the clustered-dot screening method, designates a plurality of center dots without any specific directions or periodic patterns (operation S10). The halftoning method then determines a dot growth sequence about each of the plurality of center dots using a predetermined cost function (operation S20).

Another conventional method for designing a screen for outputting halftoned images is disclosed in U.S. Pat. No. 6,335,989. U.S. Pat. No. 6,335,989 discloses a halftoning printing method using donut filters, in which a screen is designed by using a cost function that is different from the cost function used in the above system (illustrated in FIG. 1). However, a considerable similarity exists between the above system (illustrated in FIG. 1) with respect to the dot growth sequence about the plurality of center dots without any specific direction and periodic patterns.

Figure 2A:
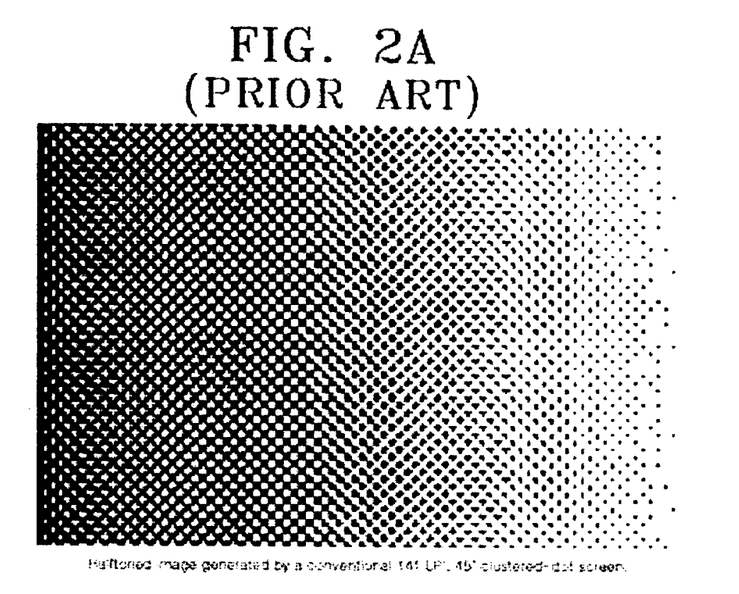
FIG. 2A is a view illustrating a halftoning result at 141 LPI and a 45° screen angle designed by a conventional halftoning method.
Figure 2B:
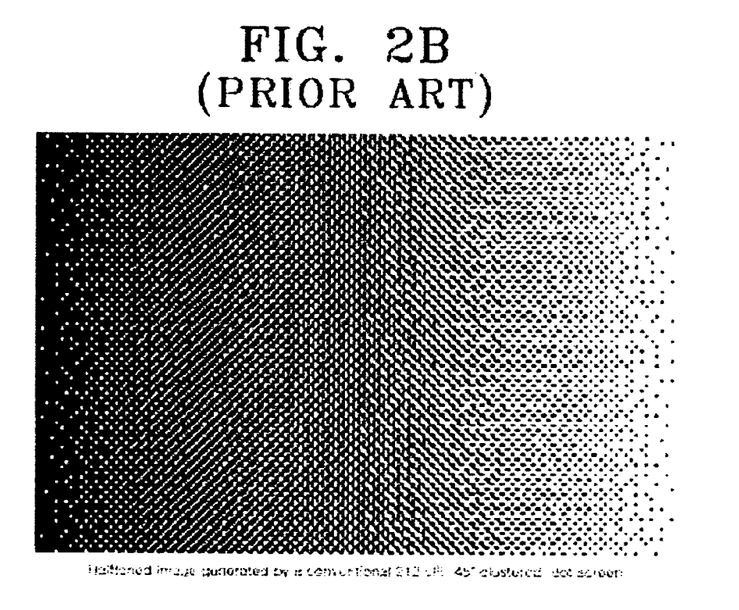
FIG. 2B is a view illustrating a halftoning result at 212 LPI and a 45° screen angle designed by the conventional halftoning method.

FIG. 2A is a view illustrating a halftoning result at 141 LPI (lines per inch) and a 45° screen angle designed by a conventional halftoning method, and FIG. 2B is a view illustrating a halftoning result at 212 LPI and a 45° screen angle designed by the conventional halftoning method.

Further, the conventional methods described above use the stochastic-dot screening method to reduce visual patterns in output halftoned images to obtain high-quality images. Further, the conventional methods described above use the clustered-dot screening method together to obtain stable outputs from imperfect output devices, such as the laser printers.

These conventional halftoning methods use momentum and distance penalty functions as cost functions to optimize dots about a center dot. However, the cost functions have a problem of insufficiency for obtaining optimal halftoned images, since the momentum and distance penalty functions do not take into account human vision characteristics and printer model characteristics.

SUMMARY OF THE INVENTION

The present general inventive concept provides a clustered-dot screen design method and a device based on human vision characteristics and printer model characteristics to produce an optimal halftoning result using a modified DBS algorithm to design a clustered-dot screen.

The present general inventive concept also provides an image-forming apparatus to output binary images on the screen designed by the clustered-dot screen design method based on the human vision characteristics and the printer model characteristics.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a clustered-dot screen design method based on human vision characteristics and printer model characteristics, the method comprising determining positions of a plurality of clustered-dot centers using a predetermined method, and designing a screen by growing specific sub-dots about the cluster centers using a predetermined algorithm according to position information of the cluster centers, the human vision characteristics, and the printer model characteristics.

The designing of the screen may comprise designing and storing a binary pattern for each of a plurality of gray levels having a gray scale between 1 and 254 based on the human visual characteristics, the printer model characteristics, and the position information of the cluster centers, and designing the screen by adding the binary patterns for the respective stored gray levels.

The predetermined algorithm may comprise a modified Direct Binary Search (DBS) algorithm.

The modified DBS algorithm may minimize a cost function $\phi$ expressed below:

$$\Phi(\tilde{e}[i,j], g[i,j], x_0[m], y_0[m]) = \sum_{all(i,j)} \tilde{e}[i,j]^2 + \sum_{(i,j) \in G_0} \operatorname*{MIN}_{m}((i-x_0[m]^2) + (j-y_0[m]^2)) - \sum_{(i,j) \in G_1} \operatorname*{MIN}_{m}((i-x_0[m]^2) + (j-y_0[m]^2))$$

$$m = 0, \ldots, M-1$$

where $(x_0[m], y_0[m])$ for $m=0, \ldots, M-1$ represent coordinates of the plurality of cluster centers, $G_0$ represents a set of coordinates of black sub-dots grown about the cluster centers, $G_1$ represents a set of coordinates of white sub-dots grown about the cluster centers, $g[i,j]$ represents a binary pattern, and $$\tilde{e}[i,j]$$

represents a visual difference value between an input image and a print out of the input image.

If a first term, $$\sum_{all(i,j)} \tilde{e}[i,j]^2,$$

of the cost function $\phi$ is minimized to minimize the cost function $\phi$, out of sub-dots placed the same distance from the cluster centers, the sub-dots are grown in an order of sub-dots having a least visual difference value between the input image and the print out of the input image to sub-dots having a greatest visual difference value of the input image and the print out of the input image.

If a second term, $$\sum_{(i,j) \in G_0} \operatorname*{MIN}_{m}((i-x_0[m]^2) + (j-y_0[m]^2)),$$

of the cost function $\phi$ is minimized to minimize the cost function $\phi$, black sub-dots are grown nearest to the cluster centers.

If a third term, $$-\sum_{(i,j) \in G_1} \operatorname*{MIN}_{m}((i-x_0[m]^2) + (j-y_0[m]^2)),$$

of the cost function $\phi$ is minimized to minimize the cost function $\phi$, white sub-dots are grown furthest from the cluster centers.

The screen may include the plurality of cluster centers, black sub-dots grown nearest to the cluster centers, and white sub-dots grown furthest from the cluster centers.

The foregoing and/or other aspects of the present general inventive concept are also achieved by providing a method of determining a clustered dot screen to form an original image using a predetermined image forming apparatus model. The method includes: determining a plurality of cluster centers for a screen, selecting a sub-dot growth sequence about the plurality of cluster centers, measuring a difference between a visual perception of the original image and a print out of the original image that is output according to the selected sub-dot growth sequence, and adjusting the selected sub-dot growth sequence one or more times to minimize the difference between the visual perception and the print out to determine an optimal sub-dot growth sequence for the predetermined image forming apparatus model.

The foregoing and/or other aspects of the present general inventive concept are also achieved by providing a method of determining a clustered dot screen to form an original image using a predetermined image forming apparatus model, the method comprising designing a plurality of binary patterns to represent a plurality of different gray level image pixels using cluster center position information, human vision characteristics, and the predetermined image forming apparatus model, and storing the plurality of binary patterns.

The foregoing and/or other aspects of the present general inventive concept are also achieved by providing a clustered-dot screen design device based on human vision characteristics and printer model characteristics, comprising a cluster center location design unit to determine positions of a plurality of clustered-dot centers using a predetermined method, and a screen design unit to design a screen using a modified Direct Binary Search (DBS) according to position information of the cluster centers, the human vision characteristics, and the printer model characteristics.

The screen design unit may include a binary pattern design unit to design a binary pattern for each of a plurality of gray levels having a gray scale between 1 and 254 based on the position information of the cluster centers, the human visual characteristics, and the printer model characteristics, and a storage unit to store the binary patterns for the respective gray levels that are designed by the binary pattern design unit, and a binary pattern combiner to create a screen by adding the binary patterns for the respective gray levels that are stored in the storage unit, if the binary patterns are completed.

The binary patterns may be stored in the storage unit in an order designed by the binary pattern combiner.

The foregoing and/or other aspects of the present general inventive concept are also achieved by providing an image-forming apparatus, comprising a memory unit to store screens each having a plurality of cluster centers, black sub-dots grown nearest to the cluster centers, and white sub-dots grown furthest from the cluster centers, and an image-processing unit to compare the screens stored in the memory unit with an input image and to output a binary image.

The foregoing and/or other aspects of the present general inventive concept are also achieved by providing an image processing device usable with an image forming apparatus to determine a clustered-dot screen to form an original image using a model of the image forming apparatus. The image processing device includes: a cluster center unit to determine a plurality of cluster centers for a screen, and a screen design unit to select a sub-dot growth sequence about the plurality of cluster centers, to measure a difference between a visual perception of the original image and a print out of the original image that is output according to the selected sub-dot growth sequence, and to adjust the selected sub-dot growth sequence one or more times to minimize the difference between the visual perception and the print out to determine an optimal sub-dot growth sequence for the image forming apparatus model.

The foregoing and/or other aspects of the present general inventive concept are also achieved by providing an image forming apparatus to determine a clustered dot screen to form an original image using model information thereof, the apparatus comprising a screen design device to design a plurality of binary patterns to represent a plurality of different gray level image pixels using cluster center position information, human vision characteristics, and the predetermined image forming apparatus model, and a storage unit to store the plurality of binary patterns.

The foregoing and/or other aspects of the present general inventive concept are also achieved by providing a computer readable medium containing executable code to perform a clustered-dot screen design method based on human vision characteristics and printer model characteristics. The medium includes: a first executable code to determine positions of a plurality of clustered-dot centers using a predetermined method, and a second executable code to design a screen by growing specific sub-dots about the plurality of cluster centers using a predetermined algorithm according to position information of the plurality of cluster centers, the human vision characteristics, and the printer model characteristics.

BRIEF DESCRIPTION OF THE DRAWINGS

These and/or aspects of the present general inventive concept will be more apparent by describing certain embodiments of the present general inventive concept with reference to the accompanying drawings, in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3:
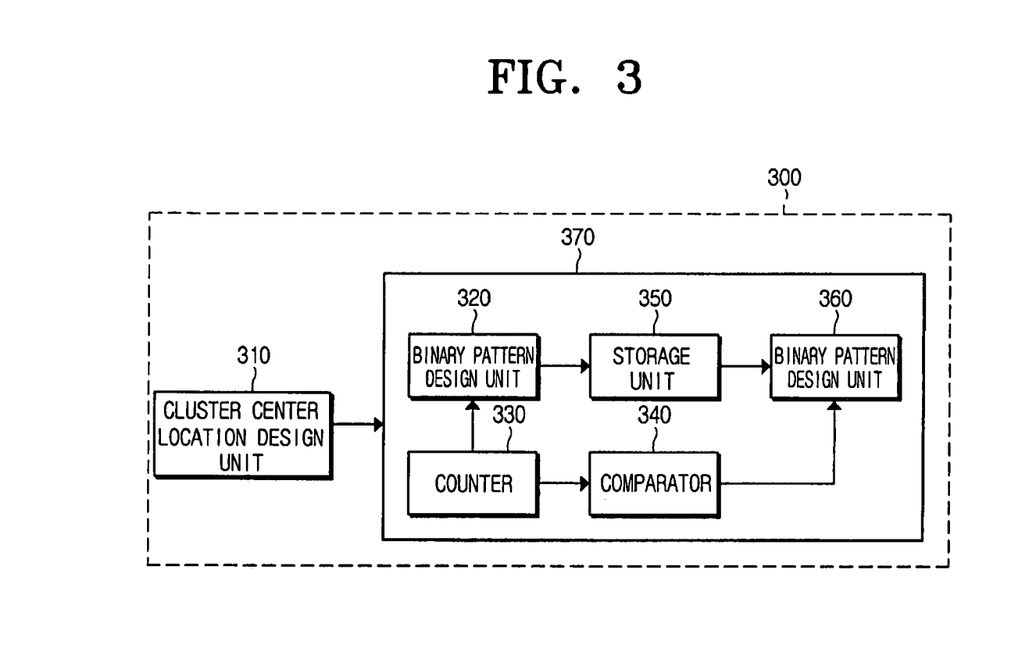
FIG. 3 is a block diagram illustrating a clustered-dot screen design device to design a screen based on human vision characteristics and printer model characteristics according to an embodiment of the present general inventive concept.

FIG. 3 is a block diagram illustrating a clustered-dot screen design device 300 based on human vision characteristics and printer model characteristics according to an embodiment of the present general inventive concept.

The clustered-dot screen design device 300 has a cluster center location design unit 310 and a screen design unit 370. The screen design unit 370 includes a binary pattern design unit 320, a counter 330, a comparator 340, a storage unit 350, and a binary pattern combiner 360.

The cluster center location design unit 310 uses an ordered dot screening method, an stochastic clustered-dot screening method, or the like to determine a plurality of positions of a plurality of clustered-dot centers (hereinafter "cluster center(s)").

The screen design unit 370 uses a modified Direct Binary Search (DBS) to design a screen according to position information of the plurality of cluster centers, the human vision characteristics, and the printer model characteristics. The binary pattern design unit 320, the counter 330, the comparator 340, the storage unit 350, and the binary pattern combiner 360 which are included in the screen design unit 370 are described below.

Figure 4:
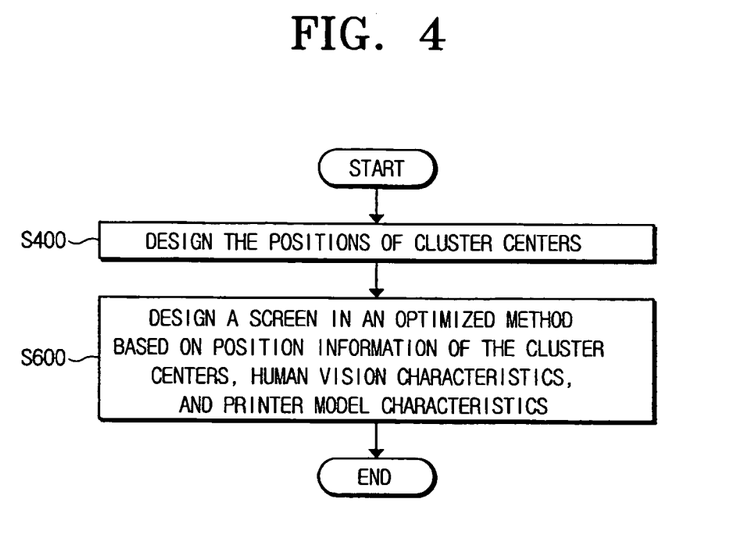
FIG. 4 is a flow chart illustrating a clustered-dot screen design method to design a screen based on human vision characteristics and printer model characteristics according to an embodiment of the present general inventive concept.

FIG. 4 is a flow chart illustrating a clustered-dot screen design method based on the human visual characteristics and the printer model characteristics according to an embodiment of the present general inventive concept.

The cluster center location design unit 310 determines the plurality of positions of the plurality of cluster centers using a predetermined method (operation S400).

The cluster centers can be determined by the ordered-dot screening method to have a specific screen angle and lines per inch (LPI), or determined by the stochastic-dot screening method not to have a specific direction or lines per inch.

The "Holladay Algorithm" disclosed in U.S. Pat. No. 4,149,194 is an example of a method of designing the cluster centers using the ordered-dot screening method. Further, the "Void and Cluster method" (Robert Ulichney) and "The Void and Cluster method for Dither Array Generation" (IS&T/SPIE Symposium on Electronic Imaging: Science and Technology, San Jose, Calif., 1993) are other examples of methods of designing the cluster centers using the stochastic-dot screen method.

Figure 5A:
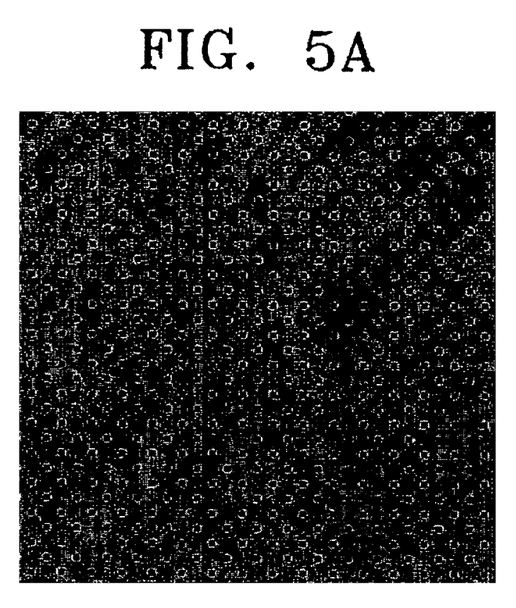
FIGS. 5A and 5B are views illustrating exemplary cluster centers positioned at an operation S400 of the clustered-dot screen design method of FIG. 4.
Figure 5B:
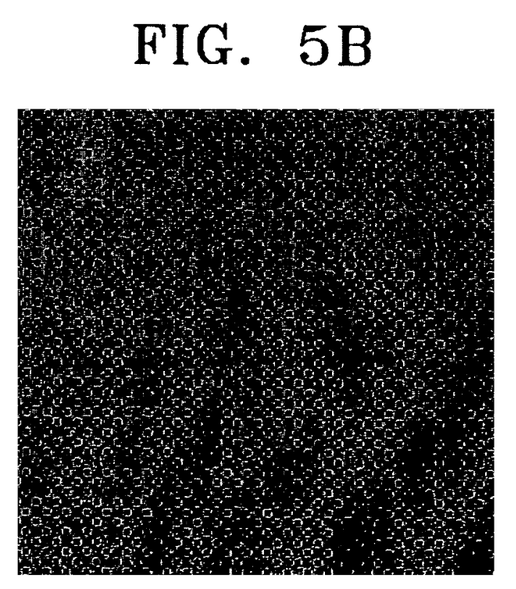

FIGS. 5A and 5B are views illustrating exemplary cluster centers designed in the operation S400 of the clustered-dot screen design method of FIG. 4. In particular, FIG. 5A is a view illustrating an example of cluster centers designed at 141 LPI and a 45° screen angle, and FIG. 5B is a view illustrating an example of cluster centers designed at 212 LPI and a 45° screen angle. The term 'screen angle' can be understood to refer to an angle between a horizontal axis and the cluster centers arranged in a predetermined direction. For example, the screen angle can refer to an angle between the horizontal axis and a diagonal along which the cluster centers are arranged.

Referring to FIGS. 3 and 4, once the positions of the plurality of cluster centers are determined in the operation S400, the screen design unit 370 uses the modified DSB algorithm to design the screen in an optimized method according to the position information of the cluster centers, the human vision characteristics, and the printer model characteristics (operation S600).

Figure 6:
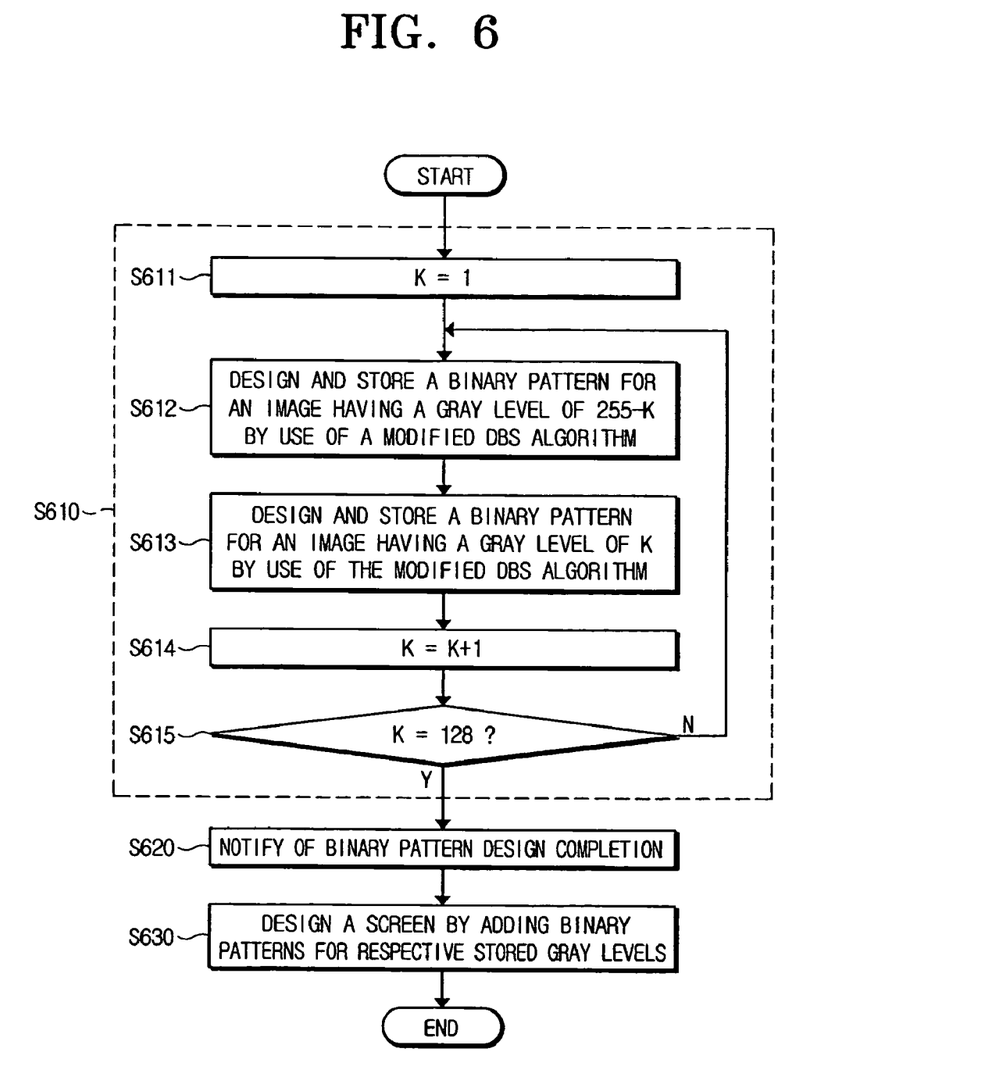
FIG. 6 is a flow chart illustrating an operation S610, which corresponds to operation S600 of the clustered-dot screen design method of FIG. 4, in detail.

FIG. 6 is a flow chart including an operation S610, which illustrates the operation S600 of the clustered-dot screen design method of FIG. 4, in more detail.

Referring to FIGS. 3 and 6, the binary pattern design unit 320 designs a binary pattern for each of a plurality of gray levels of gradations from 1 to 254 based on the human vision characteristics, the printer model characteristics, and the position information of the cluster centers provided by the cluster center location design unit 310. The binary pattern design unit 320 then stores the designed binary pattern in the storage unit 350 (operation S610), which is described below.

First, the counter 330 sets an arbitrary variable K to 1 (operation S611).

The binary pattern design unit 320 designs the binary pattern for a gradation image having a gray level of 255−K using the modified DBS algorithm and stores the designed binary pattern in the storage unit 350 (operation S612). The modified DBS algorithm is described below.

The binary pattern design unit 320 then designs the binary pattern for a gradation image having a gray level of K (operation S613). Thus, as illustrated in FIG. 6, the binary pattern design unit 320 designs the binary pattern for both the gradation image having the gray level of 255−K and the gradation image having the gray level of K in two parts (i.e., operations S612 and S613) of the same operation S610.

The counter 330 then adds a 1 to a value of the variable K to increment the value of the variable K (operation S614).

The comparator 340 checks whether the variable K reaches the value 128 (operation S615). If the variable K is less than 128, the operation S612 is repeated to perform the same process with respect to the incremented value of the variable K. If the variable K has the value of 128, the comparator 340 sends information to the binary pattern combiner 360 to indicate that the designs of the binary patterns for the gradation images having all the gray levels are complete (operation S620).

The binary pattern combiner 360 combines the binary patterns for the respective gray levels stored in the storage unit 350 to design a screen (operation S630).

Figure 7A:
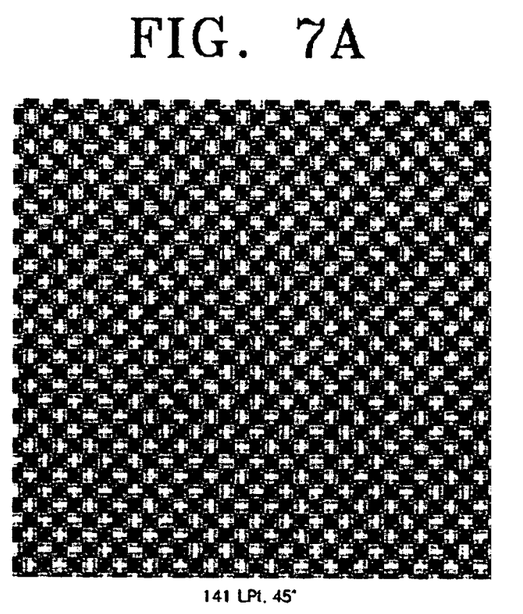
FIGS. 7A and 7B are views illustrating exemplary screens designed about the cluster centers of FIGS. 5A and 5B, respectively.
Figure 7B:
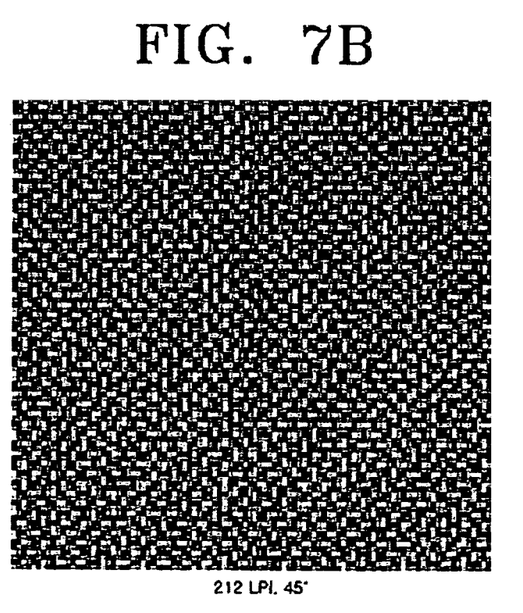

FIGS. 7A and 7B are views illustrating exemplary screens designed about the cluster centers of FIG. 5.

Using the method illustrated in FIG. 6, the binary patterns are designed for the gradation image having the gray level of 254 and the gradation image having the gray level of 1 first. The binary patterns are then designed for the gradation images that have the gray levels of (253, 2), (252, 3), . . . , (128, 127).

However, it should be understood that a design sequence of the binary patterns is not limited to the present embodiment, and the binary patterns for the gradation images can be designed in order from the gradation image having the gray level of 1 to the gradation image having the gray level of 254 or vice versa. Other design sequences may also be used with the present general inventive concept.

The binary patterns described above are designed by growing black and white dots (hereinafter 'sub-dots') about the plurality of cluster centers. The modified DBS algorithm determines positions of the sub-dots according to an embodiment of the present general inventive concept.

Figure 8:
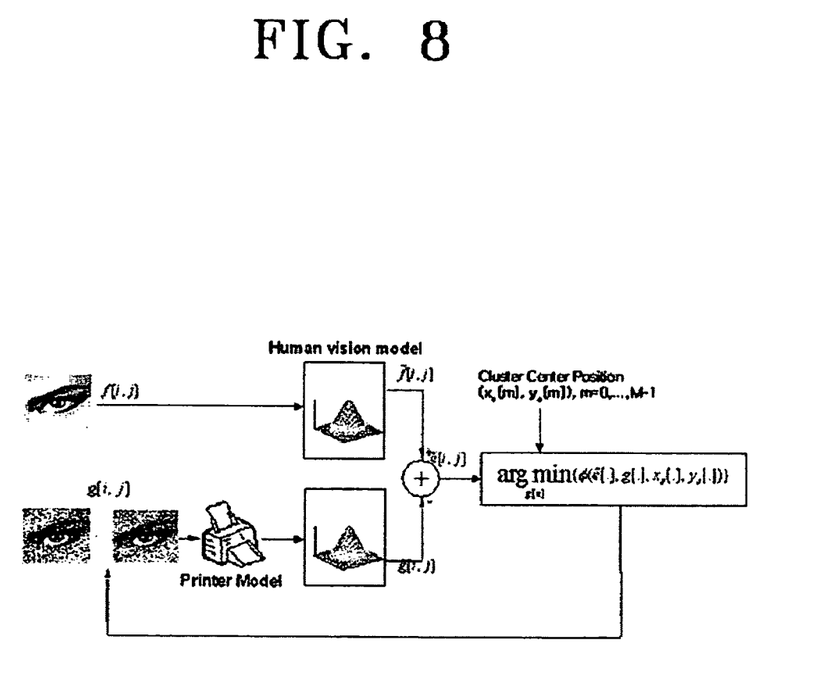
FIG. 8 is a view illustrating a modified direct binary search (DBS) algorithm according to an embodiment of the present general inventive concept.

FIG. 8 is a view illustrating the modified DBS algorithm according to an embodiment of the present general inventive concept. As illustrated in FIG. 8, the modified DBS algorithm takes into account the position information of the cluster centers, the human vision characteristics, and the printer model characteristics.

The modified DBS algorithm mainly obtains a binary pattern having a minimum cost function $\phi$ between an original input image f(i,j) and a binary pattern g(i,j) through repetitive corrections of the binary pattern. That is, as illustrated in FIG. 8, the modified DBS algorithm comprises an arg min( ) function that returns an input that minimizes an output of a function (i.e., the minimum cost function $\phi$). The cost function $\phi$, which is used for the modified DBS algorithm, can be expressed below according to an embodiment of the present general inventive concept.

$$\Phi(e[i, j], g[i, j], x_0[m], y_0[m]) = \sum_{all(i,j)} e[i, j]^2 + \sum_{(i,j) \in G_0} \text{MIN}(i - x_0[m]^2 + (j - y_0[m]^2)) - \sum_{(i,j) \in G_1} \text{MIN}(i - x_0[m]^2 + (j - y_0[m]^2)),$$

wherein $m = 0, \ldots, M - 1$

Equation 1

In Equation 1, $(x_0[m], y_0[m])$ for m=0, . . . , M−1 represent coordinates of the plurality of cluster centers, and $G_0$ and $G_1$ represent sets of coordinates of the sub-dots grown about the cluster centers, respectively, which are respectively defined as $G_0=\{(i,j)|g[i,j]=0\}$ and $G_1=\{(i,j)|g[i,j]=1\}$. That is, $G_0$ represents a set of the coordinates of black sub-dots, and $G_1$ represents a set of the coordinates of white sub-dots.

As illustrated in FIG. 8, a first term of the cost function $\phi$ is a difference value between a first visual result value of the original input image f(i, j) perceived according to the human vision characteristics and a second visual result value after printing the binary pattern g[i,j]=0 according to the printer model characteristics. In order to minimize the cost function φ, the first term of Equation 1 should be minimized. As such, the minimization of the first term of the cost function φ is achieved by first growing dots having the least human vision difference (i.e., where the difference value between the original input image f(i,j) and the binary pattern g(i,j) is a minimum) out of the sub-dots that are the same distance away from the cluster centers.

Referring to a second term of the cost function φ, the black sub-dots of g[i,j]=0 are grown to be positioned nearest to the cluster centers in order to minimize the cost function φ. Referring to a last term of the cost function φ, the white sub-dots of g[i,j]=1 are grown to be positioned furthest from the cluster centers in order to minimize the cost function φ.

As described above with reference to FIG. 3, the binary pattern design unit 320 designs optimized binary patterns using the modified DBS algorithm. The designed binary patterns are then stored in a design order in the storage unit 350, and the stored binary patterns serve as a stacking constraint when new binary patterns are designed. The "stacking constraint" is a term that is generally used in a screening technology field, which refers to a constraint that the black sub-dots grown in a binary pattern having an arbitrary gradation should be placed at the same positions in the binary patterns having a darker gradation.

Figure 9A:
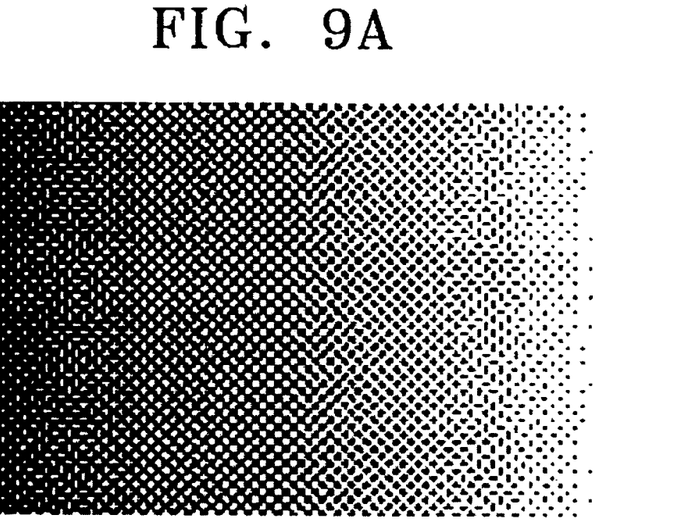
FIGS. 9A and 9B are views illustrating a halftoning result at a screen finally designed according to an embodiment of the present general inventive concept.
Figure 9B:
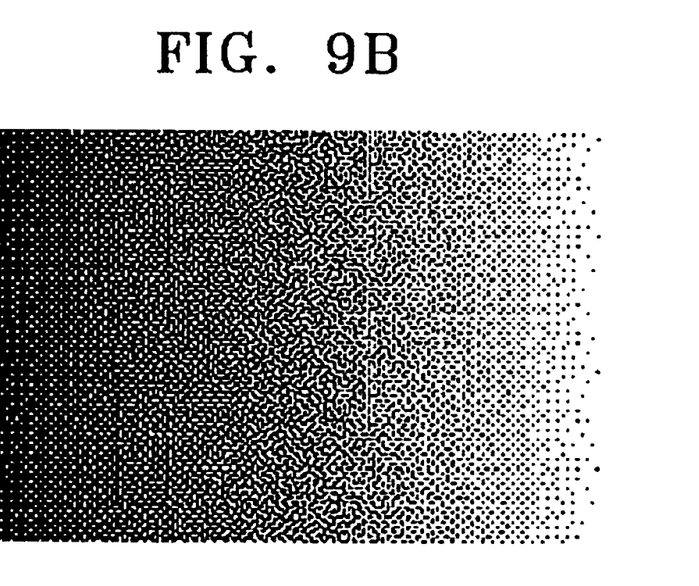

FIGS. 9A and 9B are views illustrating a halftoning result at a screen finally designed according to an embodiment of the present general inventive concept. In particular, FIG. 9A illustrates the halftoning result at 141 LPI and a 45° screen angle, and FIG. 9B illustrates the halftoning result at 212 LPI and a 45° screen angle.

When FIG. 9A and FIG. 9B are compared to FIG. 2A and FIG. 2B, respectively, it can be seen that the halftoning result at the screen designed using the clustered-dot screen design method based on the human vision characteristics and the printer model characteristics has a better image quality than the screen designed by conventional methods, since less patterns can be visualized in the halftoning results of FIGS. 9A and 9B than in the halftoning results obtained by using the conventional methods.

Figure 10:
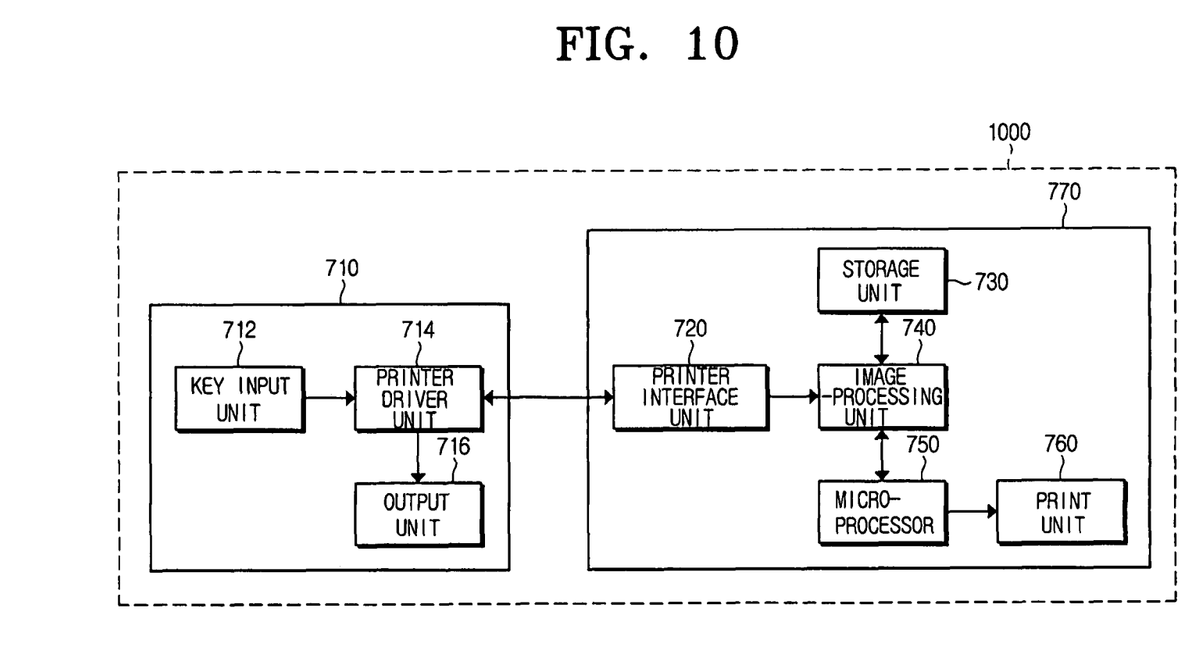
FIG. 10 is a block diagram illustrating a print system including an image-forming apparatus to output binary images using a screen designed according to an embodiment of the present general inventive concept.

FIG. 10 is a block diagram illustrating a print system 1000 including an image-forming apparatus to output binary images using a screen designed according to an embodiment of the present general inventive concept. Referring to FIG. 10, the print system 1000 includes a host part 710 and an image-forming part 770. The host part 710 and the image-forming part 770 can communicate with each other through a network.

The host part 710 includes a key input unit 712 provided such that users can manipulate various keys, a printer driver unit 714 to convert each pixel color of an input image into a gradation image in gray scale having brightness values from 0 to 255, and an output unit 716 (e.g., a monitor) to display a variety of images.

The image-forming part 770 includes a printer interface unit 720 to interface the image-forming part 770 with the host part 710, an image-processing unit 740 to convert the gradation image received from the printer driver unit 714 into a binary image, a storage unit 730 to store a designed screen, a microprocessor 750 to control a print unit 760, the print unit 760 to perform print jobs under the control of the microprocessor 750 in response to a binary image signal output from the image-processing unit 740. Screens stored in the storage unit 730 are designed by the clustered-dot screen design method based on the human vision characteristics and the printer model characteristics according to an embodiment of the present general inventive concept.

When a gradation image having brightness values from 0 to 255 is provided from the printer driver unit 714 to the image-processing unit 740, the image-processing unit 740 produces and outputs the corresponding binary image signal to the microprocessor 750 by comparing the screens stored in the storage unit 730 and the gradation image provided by the printer driver unit 714. Since a process to produce the binary image signal should be known by one skilled in the art, a detailed description of the process will not be provided.

If the binary image signal received from the image-processing unit 740 is "1," the microprocessor 750 controls the print unit 760 to print the binary image signal in white dots. If the received binary image signal is "0", the microprocessor 750 controls the print unit 760 to print the binary image signal in black dots.

The image forming part 770 according to the present embodiment stores the designed screens in the storage unit 730 of the image-forming part 770 to be used to obtain the binary image signals, but the designed screens are not limited thereto. That is, the designed screens can be stored in a lookup table in the printer driver unit 714 of the host part 710 to be used to obtain the binary image signals. This is referred to as "host-based halftoning," in which case the binary images can be formed through the printer driver unit 714 of the host part 710.

As described above, the various embodiments of the present general inventive concept are capable of dealing with defects of printers by designing a dot growth sequence about cluster centers using an optimized method based on human vision characteristics and printer model characteristics to realize an optimized image quality in an output image of a printer and the dots are clustered about the cluster centers.

Further, the various embodiments of the present general inventive concept designs the dot growth sequence about the cluster centers in an optimized method according to the human vision characteristics and the printer model characteristics to implement an optimized image quality in an output image of printers.

The embodiments of the present general inventive concept can be embodied as computer readable codes on a computer readable recording medium. The computer readable recording medium may include any data storage device that can store data which can be thereafter read by a computer system. Examples of the computer readable recording medium include a read-only memory (ROM), a random-access memory (RAM), CD-ROMs, magnetic tapes, floppy disks, and optical data storage devices. The computer readable recording medium can also be distributed over network coupled computer systems so that the computer readable code is stored and executed in a distributed fashion. The embodiments of the present general inventive concept may also be embodied in hardware or a combination of hardware and software.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A clustered-dot screen design method based on human vision characteristics and printer model characteristics, the method comprising:
   determining positions of a plurality of clustered-dot centers using a predetermined method; and
   designing a screen via a screen design device by growing specific sub-dots about the plurality of cluster centers using a predetermined clustered-dot screen design algorithm to obtain a designed binary pattern having a minimum cost function between an original input image and a binary pattern through repetitive corrections of the binary pattern according to position information of the plurality of cluster centers, the human vision characteristics of the specific sub-dot growth sequence, and the printer model characteristics, wherein the predetermined algorithm comprises a modified Direct Binary Search (DBS) algorithm that minimizes a cost function $\phi$ expressed as:

$$\Phi(\tilde{e}[i,j], g[i,j], x_0[m], y_0[m]) =$$

$$\sum_{all(i,j)} \tilde{e}[i,j]^2 + \sum_{(i,j) \in G_0} \text{MIN}_m ((i - x_0[m])^2 + (j - y_0[m])^2) -$$

$$\sum_{(i,j) \in G_1} \text{MIN}_m ((i - x_0[m])^2 + (j - y_0[m])^2)) \; m = 0, \ldots, M-1$$

where $(x_0[m], y_0[m])$ for $m=0, \ldots, M-1$ represent coordinates of the plurality of cluster centers, $G_0$ represents a set of coordinates of black sub-dots grown about the cluster centers, $G_1$ represents a set of coordinates of white sub-dots grown about the cluster centers, $g[i,j]$ represents the binary pattern, and $\tilde{e}[i,j]$ represents a visual difference value between an input image and a print out of the input image.

2. The clustered-dot screen design method as claimed in claim 1, wherein the predetermined method comprises one of an ordered-dot screening method and a stochastic-dot screening method.

3. The clustered-dot screen design method as claimed in claim 1, wherein the designing of the screen and obtaining the designed binary pattern comprises:
    designing and storing the designed binary pattern for each of a plurality of gray levels having a gray scale between 1 and 254 based on the human visual characteristics, the printer model characteristics, and the position information of the plurality of cluster centers; and
    designing the screen by adding the designed binary patterns for the respective stored gray levels.

4. The clustered-dot screen design method as claimed in claim 1, wherein, if a first term, $$\sum_{all(i,j)} \tilde{e}[i,j]^2,$$

of the cost function $\phi$ is minimized to minimize the cost function $\phi$, out of sub-dots placed the same distance from the cluster centers, the sub-dots are grown in an order of sub-dots having a least visual difference between the input image and the print out of the input image to sub-dots having a greatest visual difference between the input image and the print out of the input image.

5. The clustered-dot screen design method as claimed in claim 1, wherein, if a second term, $$\sum_{(i,j) \in G_0} \text{MIN}_m ((i - x_0[m])^2 + (j - y_0[m])^2),$$

of the cost function $\phi$ is minimized to minimize the cost function $\phi$, black sub-dots are grown nearest to the cluster centers.

6. The clustered-dot screen design method as claimed in claim 1, wherein, if a third term, $$-\sum_{(i,j) \in G_1} \text{MIN}_m ((i - x_0[m])^2 + (j - y_0[m])^2),$$

of the cost function $\phi$ is minimized to minimize the cost function $\phi$, white sub-dots are grown furthest from the cluster centers.

7. The clustered-dot screen design method as claimed in claim 1, wherein the screen includes the plurality of cluster centers, black sub-dots grown nearest to the cluster centers, and white sub-dots grown furthest from the cluster centers.

8. The clustered-dot screen design method as claimed in claim 1, wherein the designing of the screen comprises:
    positioning black sub-dots closest to the cluster centers;
    positioning white sub-dots furthest from the cluster centers; and
    minimizing a visual difference between the binary patterns and pixels of an original image that the binary patterns represent.

9. A method of determining a clustered-dot screen to form an original image using a predetermined image forming apparatus model, the method comprising:
    determining a plurality of cluster centers for a screen via a screen design device;
    selecting a sub-dot growth sequence about the plurality of cluster centers;
    measuring a difference between a visual perception of the original image and a print out of the original image that is output according to the selected sub-dot growth sequence; and
    adjusting the selected sub-dot growth sequence one or more times to minimize the difference between the visual perception and the print out to determine an optimal sub-dot growth sequence for the predetermined image forming apparatus model,
    wherein selecting the sub-dot growth sequence further comprises:
    selecting black sub-dots to be closest to the plurality of cluster centers and selecting white sub-dots to be furthest from the plurality of cluster centers,
    wherein the adjusting of the selected sub-dot growth sequence comprises determining the following equation:

$$\arg\min(e[*], g[*], x_0[*], y_0[*]) \text{ for all } g[*],$$

where $e[*]$ represents the difference between the visual perception and the print out, $g[*]$ represents the selected sub-dot growth sequence used to print the print out, $x_0[*]$ and $y_0[*]$ represent x and y components of the plurality of cluster centers, and $\arg\min(*)$ is a function that returns an input value that makes an output value of a function a minimum.

10. The method as claimed in claim 9, wherein the selecting of the sub-dot growth sequence comprises selecting the sub-dot growth sequence according to position information about the plurality of cluster centers, human vision characteristics, and the predetermined image forming apparatus model.

11. The method as claimed in claim 9, wherein the plurality of cluster centers are determined according to one of an ordered-dot screening method to have a specific screen angle and a specific lines per inch and a stochastic-dot screening method not to have the specific screen angle and the specific lines per inch.

12. A method of determining a clustered-dot screen to form an original image using a predetermined image forming apparatus model, the method comprising:

designing a plurality of binary patterns via a screen design device to represent a plurality of different gray level image pixels using a predetermined clustered-dot screen design algorithm to obtain a designed binary pattern having a minimum cost function between an original input image and a binary pattern through repetitive corrections of the binary pattern according to cluster center position information, human vision characteristics of specific sub-dot growth sequence, and the predetermined image forming apparatus model; and storing the plurality of binary patterns, wherein the predetermined clustered-dot screen design algorithm comprises a modified Direct Binary Search (DBS) algorithm that minimizes a cost function $\phi$ expressed as:

$$\Phi(\tilde{e}[i,j], g[i,j], x_0[m], y_0[m]) =$$

$$\sum_{all(i,j)} \tilde{e}[i,j]^2 + \sum_{(i,j) \in G_0} \text{MIN}_m((i-x_0[m])^2 + (j-y_0[m])^2) -$$

$$\sum_{(i,j) \in G_1} \text{MIN}_m((i-x_0[m])^2 + (j-y_0[m])^2) \, m = 0, \ldots, M-1$$

where $(x_0[m], y_0[m])$ for $m=0, \ldots, M-1$ represent coordinates of the plurality of cluster centers, $G_0$ represents a set of coordinates of black sub-dots grown about the cluster centers, $G_1$ represents a set of coordinates of white sub-dots grown about the cluster centers, $g[i,j]$ represents the binary pattern, and $\tilde{e}[i,j]$ represents a visual difference value between an input image and a print out of the input image.

13. The method as claimed in claim 12, further comprising:
retrieving the plurality of binary patterns to represent a plurality of gray level image pixels of an input color image; and
forming a screen to display the input color image using the plurality of binary patterns to display a variation in brightness among the plurality of gray level image pixels to represent color.

14. The method as claimed in claim 13, wherein the formed screen comprises one of a display screen on a display device and a print out of the input image.

15. The method as claimed in claim 12, wherein the designing of the plurality of binary patterns comprises designing 254 binary patterns for 254 different gray levels between white and black by:

designing a first binary pattern to represent a gray level of 255−K;
designing a second binary pattern to represent a gray level of K; and
incrementing a value of K until the value of K is equal to 128, wherein K comprises a variable integer that is initialized to have a value of 1.

16. The method as claimed in claim 12, wherein the designing of the plurality of binary patterns comprises, for each binary pattern:

selecting at least one cluster center;
selecting a sub-dot growth sequence about the at least one cluster center to correspond to a gray level image pixel;
measuring a difference between a visual perception of an original image of the corresponding gray level image pixel and a print out of the selected sub-dot growth sequence that corresponds to the gray level image pixel; and
adjusting the selected sub-dot growth sequence one or more times to minimize the difference between the visual perception and the print out to determine an optimal sub-dot growth sequence for the corresponding gray level image pixel in the predetermined image forming apparatus model.

17. The method as claimed in claim 12, wherein the designing of the plurality of binary patterns comprises growing black and white sub-dots about cluster center dots such that there is a minimal visual difference between the plurality of binary patterns and the corresponding gray level image pixels of an input image that the plurality of binary patterns represent.

18. A clustered-dot screen design device based on human vision characteristics and printer model characteristics, comprising:

a cluster center location design unit to determine positions of a plurality of clustered-dot centers using a predetermined method; and
a screen design unit to design a screen using a modified Direct Binary Search (DBS) clustered-dot screen design algorithm based on an argument of the minimum function that minimizes a cost function output according to position information of the cluster centers, the human vision characteristics of a specific sub-dot growth sequence, and the printer model characteristics, wherein the DBS algorithm clustered-dot screen design algorithm minimizes a cost function $\phi$ expressed as:

$$\Phi(\tilde{e}[i,j], g[i,j], x_0[m], y_0[m]) =$$

$$\sum_{all(i,j)} \tilde{e}[i,j]^2 + \sum_{(i,j) \in G_0} \text{MIN}_m((i-x_0[m])^2 + (j-y_0[m])^2) -$$

$$\sum_{(i,j) \in G_1} \text{MIN}_m((i-x_0[m])^2 + (j-y_0[m])^2) \, m = 0, \ldots, M-1$$

where $(x_0[m], y_0[m])$ for $m=0, \ldots, M-1$ represent coordinates of the plurality of cluster centers, $G_0$ represents a set of coordinates of black sub-dots grown about the cluster centers, $G_1$ represents a set of coordinates of white sub-dots grown about the cluster centers, $g[i,j]$ represents the binary pattern, and $\tilde{e}[i,j]$ represents a visual difference value between an input image and a print out of the input image.

19. The clustered-dot screen design device as claimed in claim 18, wherein the screen design unit includes:

a binary pattern design unit to design a binary pattern for each of a plurality of gray levels having a gray scale between 1 and 254 based on the position information of the cluster centers, the human visual characteristics, and the printer model characteristics; and
a storage unit to store the binary patterns for the respective gray levels that are designed by the binary pattern design unit; and
a binary pattern combiner to create a screen by adding the binary patterns for the respective gray levels that are stored in the storage unit, if the binary patterns are completed.

20. The clustered-dot screen design device as claimed in claim 19, wherein the binary patterns are stored in the storage unit in an order designed by the binary pattern design unit.

21. An image-forming apparatus, comprising:
a memory unit to store screens each having a plurality of cluster centers, black sub-dots grown nearest to the cluster centers, and white sub-dots grown farthest from the cluster centers; and
an image-processing unit to compare the screens stored in the memory unit with an input image and to output a binary image, such that the image-processing unit comprises:
a screen design unit to select a sub-dot growth sequence about the plurality of cluster centers, to measure a difference between a visual perception of an original image and a print out of the original image that is output according to the selected sub-dot growth sequence, and to adjust the selected sub-dot growth sequence using the following equation:

$$\arg\min(e[*],g[*],x_0[*],y_0[*]) \text{ for all } g[*],$$

where $e[*]$ represents the difference between the visual perception and the print out, $g[*]$ represents the selected sub-dot growth sequence used to print the print out, $x_0[*]$ and $y_0[*]$ represent x and y components of the plurality of cluster centers, and arg min(*) is a function that returns an input value that makes an output value of a function a minimum.

22. The image-forming apparatus as claimed in claim 21, wherein the output binary images are formed using a clustered-dot screen design method based on human vision characteristics and printer model characteristics.

23. An image processing device usable with an image forming apparatus to determine a clustered-dot screen to form an original image using a model of the image forming apparatus, the image processing device comprising:
a cluster center unit to determine a plurality of cluster centers for a screen; and
a screen design unit to select a sub-dot growth sequence about the plurality of cluster centers, to measure a difference between a visual perception of the original image and a print out of the original image that is output according to the selected sub-dot growth sequence, and to adjust the selected sub-dot growth sequence one or more times to minimize the difference between the visual perception and the print out to determine an optimal sub-dot growth sequence for the image forming apparatus model,
wherein the selected sub-dot growth sequence is based on an argument of the minimum function that returns an input that minimizes an output of a cost function,
wherein the screen design unit adjusts the selected sub-dot growth sequence using the following equation:

$$\arg\min(e[*],g[*],x_0[*],y_0[*]) \text{ for all } g[*],$$

where $e[*]$ represents the difference between the visual perception and the print out, $g[*]$ represents the selected sub-dot growth sequence used to print the print out, $x_0[*]$ and $y_0[*]$ represent x and y components of the plurality of cluster centers, and arg min(*) is a function that returns an input value that makes an output value of a function a minimum.

24. The device as claimed in claim 23, wherein the screen design unit selects the sub-dot growth sequence by selecting black sub-dots to be closest to the plurality of cluster centers, and selecting white sub-dots to be furthest from the plurality of cluster centers.

25. The device as claimed in claim 23, wherein the screen design unit selects the sub-dot growth sequence according to position information about the plurality of cluster centers, human vision characteristics, and the predetermined image forming apparatus model.

26. The device as claimed in claim 23, wherein the plurality of cluster centers are determined according to one of an ordered-dot screening method to have a specific screen angle and a specific lines per inch and a stochastic-dot screening method not to have the specific screen angle and the specific lines per inch.

27. An image forming apparatus to determine a clustered-dot screen to form an original image using model information thereof, the apparatus comprising:
a screen design device to design a plurality of binary patterns to represent a plurality of different gray level image pixels using a predetermined clustered-dot screen design algorithm based to obtain a designed binary pattern having a minimum cost function between an original input image and a binary pattern through repetitive corrections of the binary pattern according to cluster center position information, human vision characteristics of a specific dot growth sequence, and the predetermined image forming apparatus model; and
a storage unit to store the plurality of binary patterns,
wherein the predetermined clustered-dot screen design algorithm comprises a modified Direct Binary Search (DBS) algorithm that minimizes a cost function $\phi$ expressed as:

$$\Phi(\tilde{e}[i,j], g[i,j], x_0[m], y_0[m]) = \sum_{all(i,j)} \tilde{e}[i,j]^2 + \sum_{(i,j) \in G_0} \operatorname*{MIN}_{m}((i-x_0[m])^2 + (j-y_0[m])^2)) - \sum_{(i,j) \in G_1} \operatorname*{MIN}_{m}((i-x_0[m])^2 + (j-y_0[m])^2)) \, m = 0, \ldots, M-1$$

where $(x_0[m], y_0[m])$ for $m=0, \ldots, M-1$ represent coordinates of the plurality of cluster centers, $G_0$ represents a set of coordinates of black sub-dots grown about the cluster centers, $G_1$ represents a set of coordinates of white sub-dots grown about the cluster centers, $g[i,j]$ represents the binary pattern, and $\tilde{e}[i,j]$ represents a visual difference value between an input image and a print out of the input image.

28. The apparatus as claimed in claim 27, further comprising:
an image processing unit to retrieve the plurality of binary patterns from the storage unit to represent a plurality of gray level image pixels of an input color image and to form a screen to display the input color image using the plurality of binary patterns to display a variation in brightness among the plurality if gray level image pixels to represent color.

29. The apparatus as claimed in claim 28, further comprising:
a driver unit to convert pixels of the input color image into the plurality of gray level image pixels and to provide the plurality of gray level image pixels to the image processing unit.

30. The apparatus as claimed in claim 28, wherein the formed screen comprises one of a display screen on a display device and a print out of the input image.

31. The apparatus as claimed in claim 28, further comprising:
a microprocessor to control the image forming apparatus, to receive a binary image signal from the image processing unit, to print the binary image signal in white dots when the binary image signal has a value of 1, and to print the binary image signal in black dots when the binary image signal has a value of 0, wherein the image processing unit determines the binary image signal by comparing the stored binary patterns with the plurality of gray level image pixels of the input color image.

32. The apparatus as claimed in claim 27, wherein the screen design device designs 254 binary patterns for 254 different gray levels between white and black by: designing a first binary pattern to represent a gray level of 255−K, designing a second binary pattern to represent a gray level of K, and incrementing a value of K until the value of K is equal to 128, wherein K comprises a variable integer that is initialized to have a value of 1.

33. The apparatus as claimed in claim 27, wherein, for each binary pattern, the screen design device: selects at least one cluster center, selects a sub-dot growth sequence about the at least one cluster center to correspond to a gray level image pixel, measures a difference between a visual perception of an original image of the corresponding gray level image pixel and a print out of the selected sub-dot growth sequence that corresponds to the gray level image pixel, and adjusts the selected sub-dot growth sequence one or more times to minimize the difference between the visual perception and the print out to determine an optimal sub-dot growth sequence for the corresponding gray level image pixel in the image forming apparatus model.

34. The apparatus as claimed in claim 27, wherein the screen design device designs the plurality of binary patterns by growing black and white sub-dots about cluster center dots such that there is a minimal visual difference between the plurality binary patterns and the corresponding gray level image pixels of an input image that the plurality of binary patterns represent.

35. A non-transitory computer readable medium containing executable code to perform a clustered-dot screen design method based on human vision characteristics and printer model characteristics, the medium comprising:
a first executable code to determine positions of a plurality of clustered-dot centers using a predetermined method; and
a second executable code to design a screen by growing specific sub-dots about the plurality of cluster centers using a predetermined clustered-dot screen design algorithm to obtain a designed binary pattern having a minimum cost function between an original input image and a binary pattern through repetitive corrections of the binary pattern according to position information of the plurality of cluster centers, the human vision characteristics of the specific sub-dot growth sequence, and the printer model characteristics,
wherein the predetermined clustered-dot screen design algorithm comprises a modified Direct Binary Search (DBS) algorithm that minimizes a cost function $\phi$ expressed as:

$$\Phi(\tilde{e}[i,j], g[i,j], x_0[m], y_0[m]) = \sum_{all(i,j)} \tilde{e}[i,j]^2 + \sum_{(i,j) \in G_0} \operatorname*{MIN}_{m}((i-x_0[m]^2) + (j-y_0[m]^2)) - \sum_{(i,j) \in G_1} \operatorname*{MIN}_{m}((i-x_0[m]^2) + (j-y_0[m]^2)) \, m = 0, \ldots, M-1$$

where $(x_0[m], y_0[m])$ for $m=0, \ldots, M-1$ represent coordinates of the plurality of cluster centers, $G_0$ represents a set of coordinates of black sub-dots grown about the cluster centers, $G_1$ represents a set of coordinates of white sub-dots grown about the cluster centers, $g[i,j]$ represents the binary pattern, and $\tilde{e}[i,j]$ represents a visual difference value between an input image and a print out of the input image.

* * * * *